(12) United States Patent
Kalika et al.

(10) Patent No.: US 7,860,507 B2
(45) Date of Patent: *Dec. 28, 2010

(54) NODE PLACEMENT METHOD WITHIN A WIRELESS NETWORK, SUCH AS A WIRELESS LOCAL AREA NETWORK

(75) Inventors: Leonid Kalika, Santa Monica, CA (US); Alexander Berg, Tarzana, CA (US); Gabi Abraham, Oak Park, CA (US); Cyrus Irani, Palos Verdes Estates, CA (US); Pavel Pechac, Prague (CZ); Ana L. Martinez, Los Angeles, CA (US)

(73) Assignee: Strix Systems, Inc., Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/464,638

(22) Filed: May 12, 2009

(65) Prior Publication Data

US 2010/0014496 A1    Jan. 21, 2010

Related U.S. Application Data

(63) Continuation of application No. 10/549,341, filed as application No. PCT/US2004/009074 on Mar. 24, 2004, now Pat. No. 7,539,495.

(60) Provisional application No. 60/457,529, filed on Mar. 24, 2003.

(51) Int. Cl.
   *H04Q 7/20*    (2006.01)

(52) U.S. Cl. .............. 455/446; 455/424; 455/41.2; 455/67.11; 455/63.1; 455/115.1; 455/226.1; 703/6; 703/21; 703/22

(58) Field of Classification Search ............. 455/446, 455/422.1, 423, 424, 67.11, 226.1; 703/6, 703/21, 22
See application file for complete search history.

(56) References Cited

U.S. PATENT DOCUMENTS

| | | |
|---|---|---|
| 5,987,011 A | 11/1999 | Toh et al. |
| 6,499,006 B1 | 12/2002 | Rappaport et al. |
| 6,691,293 B2 | 2/2004 | Kanazawa |
| 6,760,748 B1 | 7/2004 | Hakim |
| 6,971,063 B1 | 11/2005 | Rappaport et al. |
| 2007/0117567 A1 | 5/2007 | Rappaport et al. |

OTHER PUBLICATIONS

International Search Report and Written Opinion; International Patent Application PCT/US04/09074, filed Mar. 24, 2004 (WO 2004/086783); Applicant—Strix Systems, Inc., mailed Aug. 3, 2004; 8 pp.

*Primary Examiner*—Temica M Beamer
(74) *Attorney, Agent, or Firm*—Kelley Drye & Warren, LLP

(57) ABSTRACT

The disclosure includes a method of and associated system for placing nodes in a wireless local area network (WLAN). The method includes receiving user-specified parameters regarding the network. The parameters can include a layout of a building or other space, and requirements for the WLAN. An algorithm then employs these parameters to automatically create and optimized layout of multiple wireless access points for the WLAN. The method can display the layout and provide various types of information to the user.

17 Claims, 19 Drawing Sheets

WIRELESS LOCAL AREA NETWORK SYSTEM

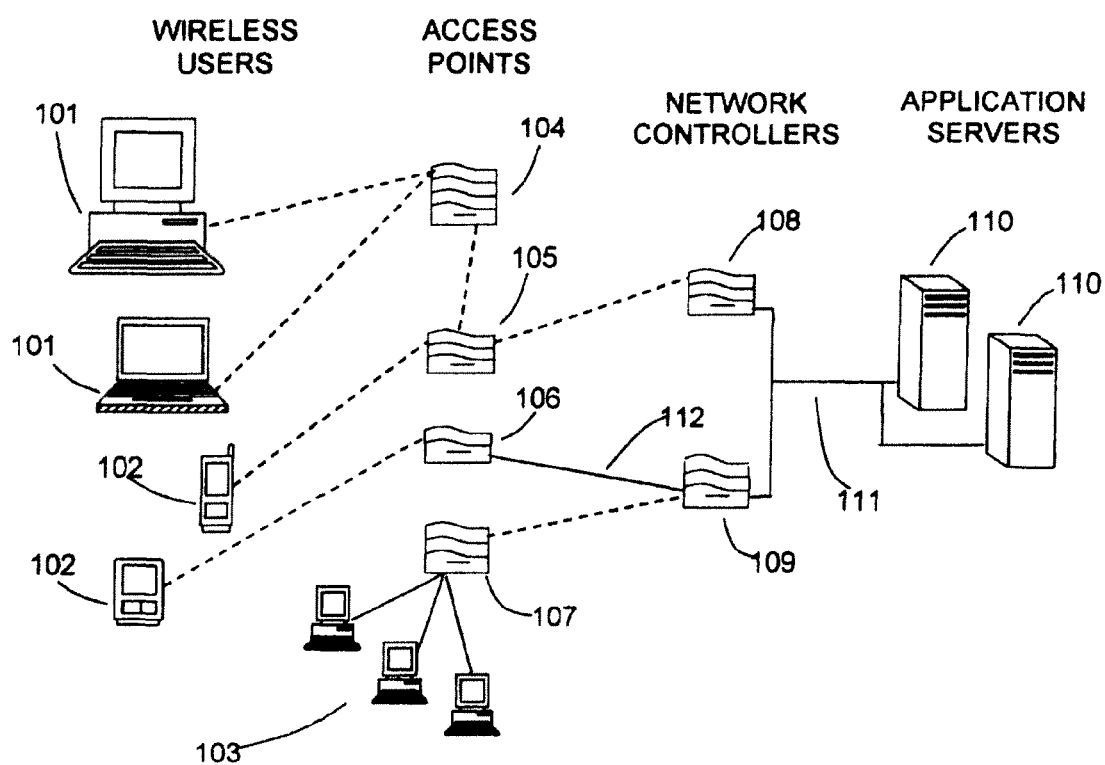
FIG.1A    WIRELESS LOCAL AREA NETWORK SYSTEM

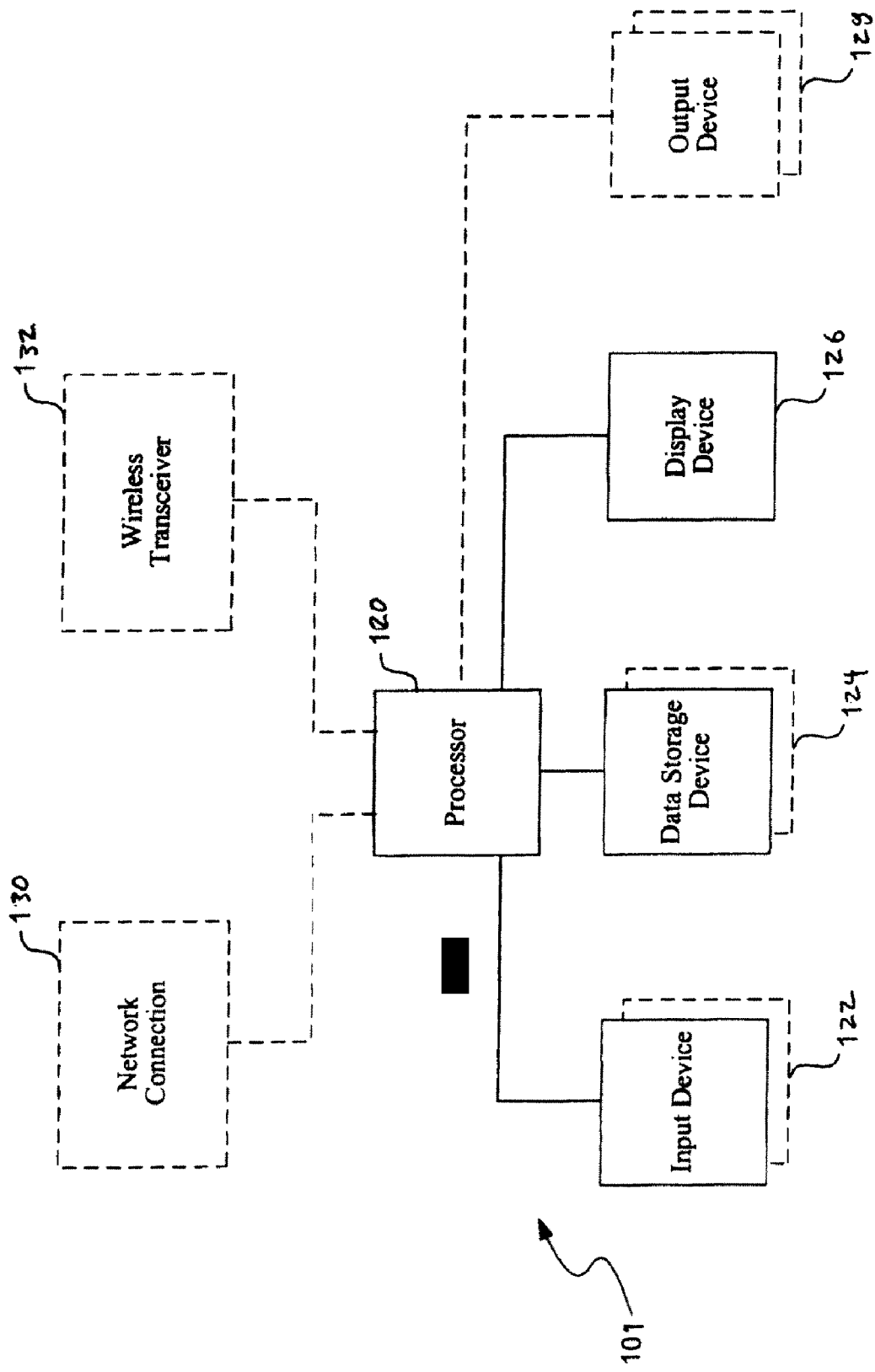

| Project | Wall | Antennas |

Project Assumption

Antenna Type
Ethernet Port Constraint
Power Outlet Constraint
Nodes Per Server
Minimum Number of Servers
Model
Setting

| Technology | Transmit Power | Bit Rate (Mbps) | Sq. Coverage (ft) |
|---|---|---|---|
| 802.11a | dBm | | |
| 802.11b | dBm | | |
| 802.11c | dBm | | |
| Bluetooth | dBm | | |

[Close]

*FIG. 4B*

| Project | Wall | Antennas |

Wall Assumptions

| Name | Attenuation 802.11a | Attenuation 802.11b | Attenuation 802.11c | Attenuation Blue Tooth |
|---|---|---|---|---|
| | | | | |
| | | | | |
| | | | | |
| | | | | |
| Floor propagation | | | | |

[Close]

*FIG. 4C*

Inventory by Node          602

| Inventory Web Page Dialog | | | |
|---|---|---|---|
| Inventory by Node | Inventory by Module | | |

| Node node_0 | | |
|---|---|---|
| Base Module | Description | Qty |
| BME1 | Base Module with 1 Ethernet (PoE) | 1 |
| Wireless Module | Description | Qty |
| WM11A | 802.11a Wireless Module | 1 |
| WM11G | 802.11g Wireless Module | 1 |
| Antenna Module | Description | Qty |
| AM11AABG | Multi-function Antenna Module | 1 |
| System Module | Description | Qty |
| NWSV | Network Server | 1 |
| Node node_1 | | |
| Base Module | Description | Qty |
| BME0 | Base Module with 1 Ethernet (PoE) | 1 |
| Wireless Module | Description | Qty |
| WM11A | 802.11a Wireless Module | 1 |
| WM11G | 802.11g Wireless Module | 1 |
| Antenna Module | Description | Qty |
| AM11AABG | Multi-function Antenna Module | 1 |
| AMEA | External Antenna Module | 1 |
| Node node_2 | | |
| Base Module | Description | Qty |
| BME0 | Wireless Base Module | 1 |
| Wireless Module | Description | Qty |
| WM11A | 802.11a Wireless Module | 1 |

*FIG. 6*

Inventory by Module

| Base Module | Description | Qty | Spare | Total | Price | Extended Node Price | Extended Sperec Price |
|---|---|---|---|---|---|---|---|
| BME0 | Wireless Base Module | 3 | 0 | 3 | $0 | $0.00 | $0 |
| BME1 | Base Module with 1 Ethernet | 1 | 0 | 1 | $0 | $0.00 | $0 |
| BME4 | Base Module with 4 Ethernet | 0 | 0 | 0 | $0 | $0.00 | $0 |
| Wireless Module | | | | | | | |
| WM11A | 802.11a Wireless Module | 6 | 0 | 6 | $0 | $0.00 | $0 |
| WM11B | 802.11b Wireless Module | 0 | 0 | 0 | $0 | $0.00 | $0 |
| WM11G | 802.11g Wireless Module | 4 | 0 | 4 | $0 | $0.00 | $0 |
| WMBT | Bluetooth Wireless Module | 0 | 0 | 0 | $0 | $0.00 | $0 |
| Antenna Module | | | | | | | |
| AM11AABG | Antenna Module | 4 | 0 | 4 | $0 | $0.00 | $0 |
| AMEA | External Antenna Adapter | 2 | 0 | 2 | $0 | $0.00 | $0 |
| AMEC | External Antenna Cap | 0 | 0 | 0 | $0 | $0.00 | $0 |
| System Module | | | | | | | |
| MWSV | Network Server Module | 1 | 0 | 1 | $0 | $0.00 | $0 |
| | | | | | | $0.00 | $0 |
| Grand Total Price | | | | | | | $0.00 |

| | Radius | Area | Correction 30% |
|---|---|---|---|
| | 165 | 85,530 | 25,659 |
| 9 Mbps: | 157 | 77,437 | 23,231 |
| 12 Mbps: | 149 | 69,746 | 20,924 |
| 18 Mbps: | 132 | 54,739 | 16,422 |
| 24 Mbps: | 115 | 41,548 | 12,464 |
| 36 Mbps: | 99 | 30,791 | 9,237 |
| 48 Mbps: | 82 | 21,124 | 6,337 |
| 54 Mbps: | 60 | 11,310 | 3,393 |
| 108 Mbps: | 30 | 2,827 | 848 |

802.11G

| | Radius | Area | Correction 35% |
|---|---|---|---|
| 6 Mbps: | 165 | 85,530 | 29,935 |
| 9 Mbps: | 157 | 77,437 | 27,103 |
| 12 Mbps: | 149 | 69,746 | 24,411 |
| 18 Mbps: | 132 | 54,739 | 19,159 |
| 24 Mbps: | 115 | 41,548 | 14,542 |
| 36 Mbps: | 99 | 30,791 | 10,777 |
| 48 Mbps: | 82 | 21,124 | 7,393 |
| 54 Mbps: | 60 | 11,310 | 3,958 |
| 108 Mbps: | 30 | 2,827 | 990 |

802.11B

| | Radius | Area | Correction 30% |
|---|---|---|---|
| 1 Mbps: | 300 | 282,743 | 84,823 |
| 2 Mbps: | 252 | 199,504 | 59,851 |
| 5.5 Mbps | 185 | 107,521 | 32,256 |
| 11 Mbps | 154 | 74,506 | 22,352 |

Bluetooth

| | radius | Area | Correction 30% |
|---|---|---|---|
| 1 Mbps | 15 | 707 | 212 |

*FIG. 9A*

|  | BitRate | Max Throughput |
|---|---|---|
| 802.11b | 11 Mbps | 5.9 Mbps |
| 802.11g (with 11b) | 54 Mbps | 14.4 Mbps |
| 802.11g (11g-only mode) | 54 Mbps | 24.4 Mbps |
| 802.11a | 54 Mbps | 24.4 Mbps |
| 802.11a TURBO | 108 Mbps | 42.9 Mbps |
| Bluetooth | 1 Mbps | 400 Kbps |

|  | BitRate | Receive sensitivity |
|---|---|---|
| 802.11A | 6 Mbps | -85 dBm |
|  | 9 Mbps | -84 dBm |
|  | 12 Mbps | -83 dBm |
|  | 18 Mbps | -81 dBm |
|  | 24 Mbps | -77 dBm |
|  | 36 Mbps | -74 dBm |
|  | 48 Mbps | -69 dBm |
|  | 54 Mbps | -68 dBm |
|  | 108 Mbps | -65 dBm |
| 802.11B | 1 Mbps | -94 dBm |
|  | 2 Mbps | -93 dBm |
|  | 5.5 Mbps | -92 dBm |
|  | 11 Mbps | -91 dBm |
| Bluetooth | 1 Mbps (Green) | -50 dBm |
|  | 1 Mbps (Yellow) | -70 dBm |
|  | 1 Mbps (red) | -80 dbm |

|  | BitRate | Receive sensitivity |
|---|---|---|
| 802.11G | 6 Mbps | -87 dBm |
|  | 9 Mbps | -85 dBm |
|  | 12 Mbps | -84 dBm |
|  | 18 Mbps | -82 dBm |
|  | 24 Mbps | -78 dBm |
|  | 36 Mbps | -75 dBm |
|  | 48 Mbps | -69 dBm |
|  | 54 Mbps | -68 dBm |

*FIG. 9B*

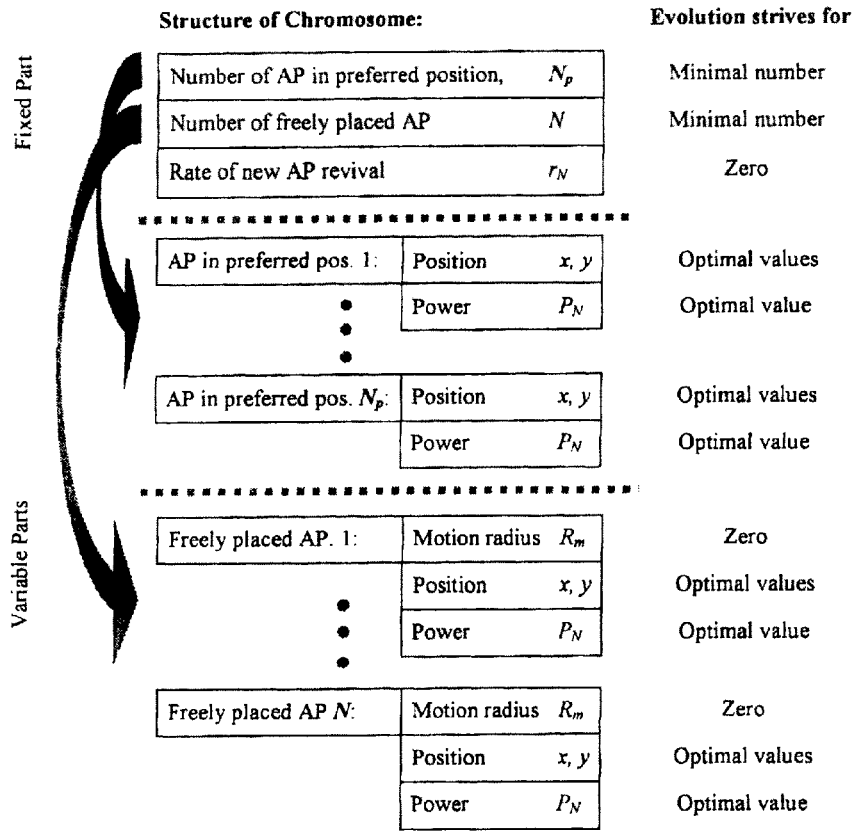
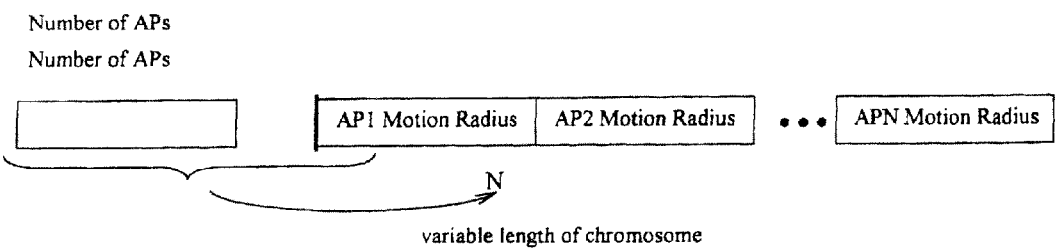
FIG 12

NODE PLACEMENT METHOD WITHIN A WIRELESS NETWORK, SUCH AS A WIRELESS LOCAL AREA NETWORK

CROSS-REFERENCE TO RELATED APPLICATION

This application is a continuation application of the Non-provisional patent application Ser. No. 10/549,341 filed Nov. 17, 2006 now U.S. Pat. No. 7,539,495 (Publication Number 2007-0054670), which is a National Stage of the PCT Application No. PCT/US2004/009074 filed Mar. 24, 2004 (Publication WO 2004/086783), which claims the benefit of U.S. Provisional Patent Application No. 60/457,529, filed Mar. 24, 2003.

BACKGROUND

Wireless telecommunications networks require significant effort in placing nodes or access points within a geographic area to ensure proper wireless coverage for users in that area. An access point (AP) is typically a physical edge device that allows wireless user devices to access network resources, and it is sometimes referred to as a node. With cellular telephone networks, service providers establishing base stations or APs must contend with topographical or terrain constraints, buildings, foliage, and other obstructions that attenuate or block wireless transmissions.

Similar problems occur when establishing a wireless local area network (WLAN). WANs typically employ existing protocols such as those under IEEE 802.11, which is a specification that defines WLAN data link and physical layers. The 802.11 specification includes a media access control (MAC) sublayer within a data link layer, and two sublayers of the physical layer (PHY), orthogonal frequency division multiplexing (OFDM) and a direct-sequence spread-spectrum (DSSS) modulation scheme. The Bluetooth specification (IEEE 802.15) uses a frequency-hopping spread spectrum (FHSS) modulation scheme.

The FHSS technique modulates a data signal with a narrow band carrier signal that "hops" in a predictable sequence from frequency to frequency as a function of time over a wide band of frequencies. Interference is reduced because a narrow band interferer affects the spread-spectrum signal only if both are transmitting at the same frequency at the same time. The transmission frequencies are determined by a spreading (hopping) code. The receiver must be set to the same hopping code and must listen for the incoming signal at the proper time and frequency to receive the signal. OFDM splits a wide frequency band into a number of narrow frequency bands and sends data across the sub-channels. DSSS combines a data signal at the sending station with a higher data rate bit sequence that often is referred to as a "chip sequence." A high processing gain increases the signal's resistance to interference.

Various IEEE 802.11 protocols exist, including 802.11a, 802.11b, 802.11g, 802.11e, 802.11i and others. These and other protocols are often referred to as "WiFi," which is short for wireless fidelity. Other short-range wireless protocols include Bluetooth (IEEE 802.15), and Hiperlan, which has been adopted by the European Telecommunications Standards Institute (ETSI).

With increasing demands on quality of service, including user coverage, data throughput, RF interference, etc., planning an optimization of wireless networks has become an ever more important issue. While OFDM and DSSS help to reduce interference, they of course suffer from obstacles within their wireless range that attenuate their signals. Further, each has limited range, and thus multiple access points under any of the 802.11 protocols must be placed within a large area to ensure proper coverage. These are only some of the concerns faced in establishing a WLAN.

BRIEF DESCRIPTION OF THE DRAWINGS

FIG. 1A is a diagram of a wireless local area network system showing one physical configuration of an embodiment of the invention that provides wireless services to various users and includes a connection with a conventional wired network.

FIG. 1B is a block diagram of a suitable computer system for employing aspects of the invention.

FIG. 4B is a computer screenshot showing user-configurable project assumptions or parameters.

FIG. 4C is a computer screenshot showing user-configurable wall assumptions or parameters.

FIG. 6 is a computer screenshot of an example of an inventory by node.

FIG. 7 is a computer screenshot of an example of an inventory by module.

FIGS. 9A and 9B are examples of tables employed by the optimization process of FIGS. 8A and 8B.

FIG. 12 is a schematic diagram of a data structure employed by the optimization process.

Figure 2A:
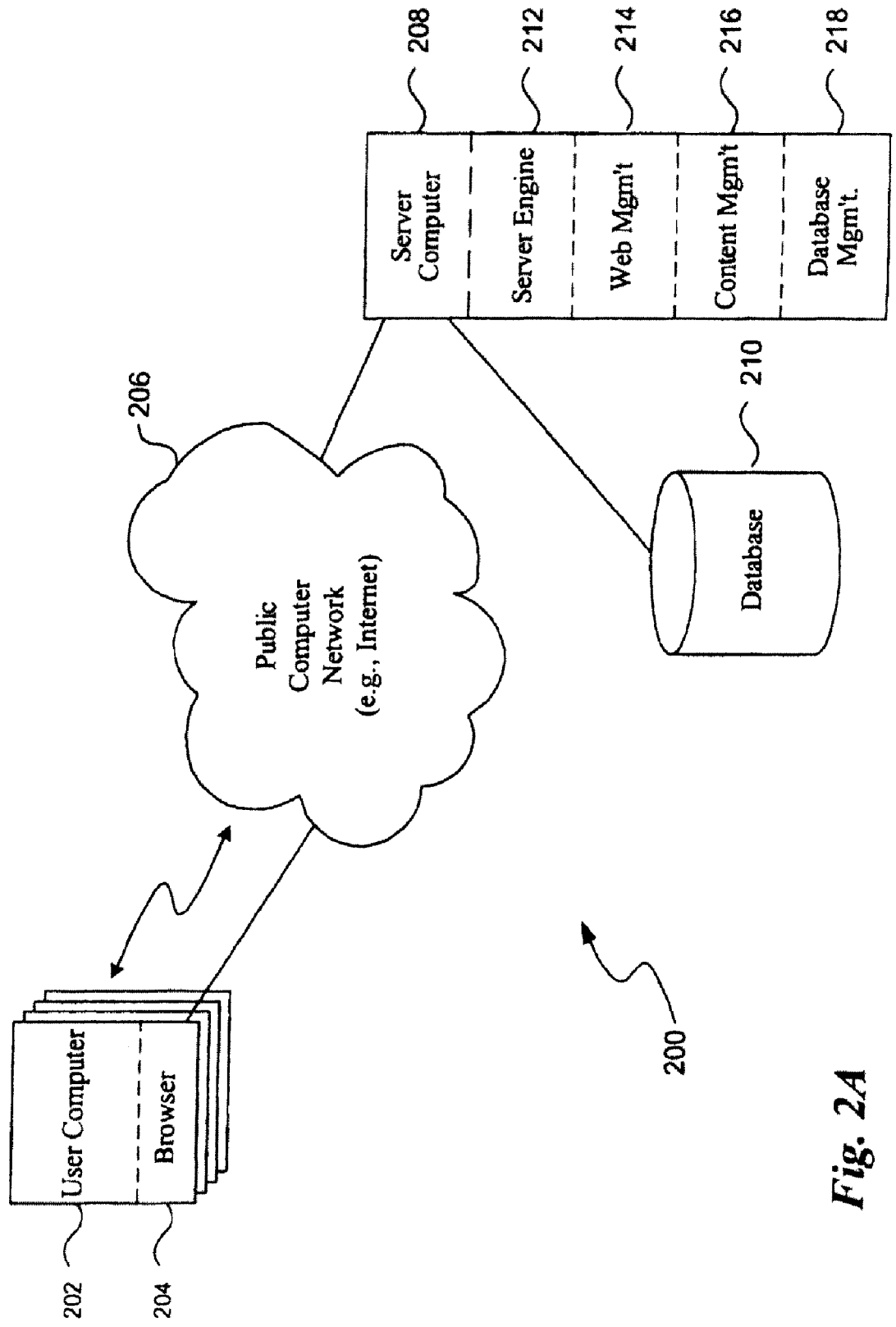
FIG. 2A is a block diagram illustrating a suitable system in which aspects of the invention may operate in a networked computer environment.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 1104 is first introduced and discussed with respect to FIG. 11).

A portion of this disclosure contains material to which a claim for copyright is made. The copyright owner has no objection to the facsimile reproduction by anyone of the patent document or patent disclosure (including the Figures)

as it appears in the Patent and Trademark Office patent file or records, but the copyright owner reserves all other copyright rights whatsoever.

DETAILED DESCRIPTION OF THE ILLUSTRATED EMBODIMENTS

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below: however, any terminology intended to be interpreted in any restricted manner will be overtly and specifically defined as such in this Detailed Description section.

A. OVERVIEW

As described in greater detail below, a node placement method and system allows users to readily construct a wireless local area network (WLAN). A user inputs, in digital format, a drawing or sketch of a floor plan layout or a space to be occupied by the network. Examples include drawings scanned or imported into the system In existing formats, such as bitmap, JPEG, GIF, TIE, AutoCAD or PDF formats. The software accepts almost any format that can show the positions and dimensions of walls, wired Ethernet connections, and other space layout information that affects the positioning of nodes and their operation as a WLAN. The user responds to a computer-driven questionnaire that elicits essential information about construction details, such as the materials used in each wall, to help refine the model.

As described below, the software follows a process that entails making successive approximations until it meets the user's constraints and performance requirements. It uses empirical table look-up and other procedures to calculate a number of access points (APs) required based on, e.g., a specified number of users, a bandwidth, a failure rate, and radio-frequency technologies. It then disperses these APs throughout the specified area by means of a simple geometric rule, working with the input layout information and observing constraints on mounting and distance from wiring connections. It then calculates signal strength throughout the space, using propagation formulas and the user-input information regarding building construction. If the requirements are not met, it adds one or more nodes and repeats the calculations.

In a broad sense aspects of the invention include a method of and associated system for placing nodes in a wireless local area network (WLAN). The method includes receiving user-specified parameters regarding the network. The parameters can include a layout of a building or other space, and requirements for the WLAN. An algorithm then employs these parameters to automatically create an optimized layout of multiple wireless access points for the WLAN. The method can display the layout and provide various types of information to the user.

A general discussion of a WLAN will first be provided, followed by a general discussion of a computer environment in which the optimization process may be performed. Thereafter, details on the optimization process, including a user interface, are provided.

B. SUITABLE ENVIRONMENT

Referring to FIG. 1A, an example of a WLAN that the optimization process would help to establish is shown. Many different configurations are possible using the same methods and principles described here. Wireless users may be making use of various types of personal computers 101 equipped with wireless connectivity, or they may be using portable wireless digital devices 102. Another class of user that the system is intended to accommodate is made up of small groups of users who have personal computers with wired Ethernet connectivity. Such a group is called a workgroup, and an example is shown at 103. Numbers of each of the various types of network nodes, such as those shown at 104, 105, 106, 107, 108, and 109, form a wireless network.

The wireless network is intended to connect with a conventional main backbone wired network system, illustrated here by application servers 110 and their wired Ethernet connections 111. The personal computers 101 and portable devices 102 connect wirelessly into the network through nodes serving as access points 104, 105, and 106 by means of standard digital wireless technology, of which there are several types in general use, and as described herein. The access point used by a particular personal computer or device will ordinarily be the node closest to it that supports the wireless technology used by the personal computer or wireless device. Workgroup computers, such as those shown at 103, are connected to their access point nodes, such as 107, by means of Ethernet cables.

A connection by a user or client to a node is known as an Access Point (AP) connection. AP nodes also connect back to the main backbone wired network system. If the connection back to the main backbone wired network system is wireless, it is known as a "Backhaul" (BH) connection. Some AP nodes in the system, such as that shown here as 104, may connect back to the main backbone wired network system via another AP node acting as a relay, such as that shown here at 105. Other AP nodes, such as those shown here at 105 and 107, connect back wirelessly via nodes acting as Network Controllers (NC) or backhaul nodes, shown here at 108 and 109. Yet other AP nodes, such as 106, may connect back through an Ethernet wire 112 via an NC node, such as 109.

Networks may contain more or fewer nodes than are shown in this example, and many other combinations of wired and wireless data communication functions in particular nodes are possible. Every such network will contain at least one AP for wireless user connections, at least one main network connection by wired Ethernet, and at least one NC for management subsystem services.

Each node in the system, such as 104 or 108, may be comprised of an assembly, or "stack," of modules, each of which contains the hardware and software required to implement its designated function. In its role as a network access point the node 104 may be required to communicate user data by means of two different standard wireless technologies and to perform some network system functions. Therefore such an access point may include an embedded computer including one or more processors and memory, and a stack of modules including: 1) wireless modules that have radio-frequency components and other electronics to implement standard wireless data communication technology such as that described in IEEE specification 802.11b, 802.11a or Bluetooth; 2) an antenna module; and 3) a base module to supply power to the other modules. Other modules are of course possible. Under such a configuration, each of the nodes in the WLAN network system contains electronics and components necessary to implement the data communications functions required of it, and at least one embedded computer or processor to execute the software, the same software being used in other nodes.

Unless described otherwise herein, the blocks and elements depicted in FIG. 1A and the other Figures are well known or are described in detail in the above cross-referenced provisional patent application. Indeed, much of the detailed description provided herein is explicitly disclosed in the above provisional patent application; much of the additional material of aspects of the invention will be recognized by those skilled in the relevant art as being inherent in the detailed description provided in such provisional patent application, or well known to those skilled in the relevant art. Those skilled in the relevant art can implement aspects of the invention based on the Figures and the detailed description provided in the provisional patent application.

FIG. 1B and the following discussion provide a brief, general description of a suitable environment in which aspects of the invention can be implemented. Although not required, aspects of the invention are described below in the general context of computer-executable instructions, such as routines executed by a general-purpose computer, e.g., a server computer, wireless device or personal computer. Those skilled in the relevant art will appreciate that the invention can be practiced with other communications, data processing or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers and the like. Indeed, the terms "computer," "host" and "host computer" are generally used interchangeably, and refer to any of the above devices and systems, as well as any data processor.

Aspects of the invention can be embodied in a special purpose computer or data processor that is specifically programmed, configured, or constructed to perform one or more of the computer-executable instructions explained in detail herein. As described below, aspects of the invention can be practiced in distributed computing environments where tasks or modules are performed by remote processing devices, which are linked through a communications network such as a Local Area Network (LAN), a Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks) on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

Referring to FIG. 1B, one aspect of the invention may be performed on a computer, such as the personal computer 101 or another computer, which typically employs one or more processors 120 coupled to one or more user input devices 122 and data storage devices 124. The computer 101 is also coupled to at least one output device, such as a display device 126 and one or more optional additional output devices 128 (e.g., printer, plotter, speakers, tactile or olfactory output devices, etc.). The computer 101 may be coupled to external computers, such as via a network connection 130, a wireless transceiver 132, or both.

The input devices 122 may include a keyboard and/or a pointing device, such as a mouse. Other input devices are possible, such as a microphone, joystick, pen, game pad, scanner, digital camera, video camera, and the like. The data storage devices 124 may include any type of computer-readable media that can store data accessible by the computer 101, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to a network, such as a LAN, a WAN, or the Internet (not shown in FIG. 1B).

Aspects of the invention may be practiced in a variety of other computing environments. For example, referring to FIG. 2A, a distributed computing environment with a World Wide Web ("Web") interface includes one or more user computers 202 in a system 200, each of which includes a browser program module 204 that permits the computer to access and exchange data with the Internet 206, including Web sites within the World Wide Web portion of the Internet. The user computers may be substantially similar to the computer 101 described above with respect to FIG. 1B. User computers may include other program modules, such as an operating system, one or more application programs (e.g., word processing or spread sheet applications), and the like. The computers may be general-purpose devices that can be programmed to run various types of applications, or they may be single-purpose devices optimized or limited to a particular function or class of functions.

At least one server computer 208, coupled to the Internet or Web 206, performs much or all of the functions for receiving, routing, and storing electronic messages, such as Web pages, audio signals, and electronic images. While the Internet is shown, a private network such as an Intranet may likewise be used herein. The network may have a client-server architecture, in which a computer is dedicated to serving other client computers, or it may have other architectures such as a peer-to-peer architecture, in which one or more computers serve simultaneously as servers and clients. A database 210 or databases, coupled to the server computer(s) 208, stores much of the Web pages and content exchanged between the user computers, as well as executable modules. The server computer(s) 208, including the database(s) 210, may employ security measures to inhibit malicious attacks on the system and to preserve the integrity of the messages and data stored therein (e.g., firewall systems, secure socket layers (SSL), password protection schemes, encryption, and the like).

The server computer 208 may include a server engine 212, a Web page management component 214, a content management component 216, and a database management component 218. The server engine 212 performs basic processing and operating system level tasks. The Web page management component 214 handles creation and display or routing of Web pages. Users may access the server computer by means of an associated URL. The content management component 216 handles many of the functions in the embodiments described herein. The database management component 218 includes storage and retrieval tasks with respect to the database, queries to the database, and storage of data such user-defined projects, which include floor plan layouts, WLAN parameters, etc., as described below.

An alternative embodiment to the system 200 may include multiple Web server computers preceded by a Web load balancing system to balance the load on the several Web server computers. Further, this alternative system may employ a distributed file system to couple the Web servers to several databases.

Figure 2B:
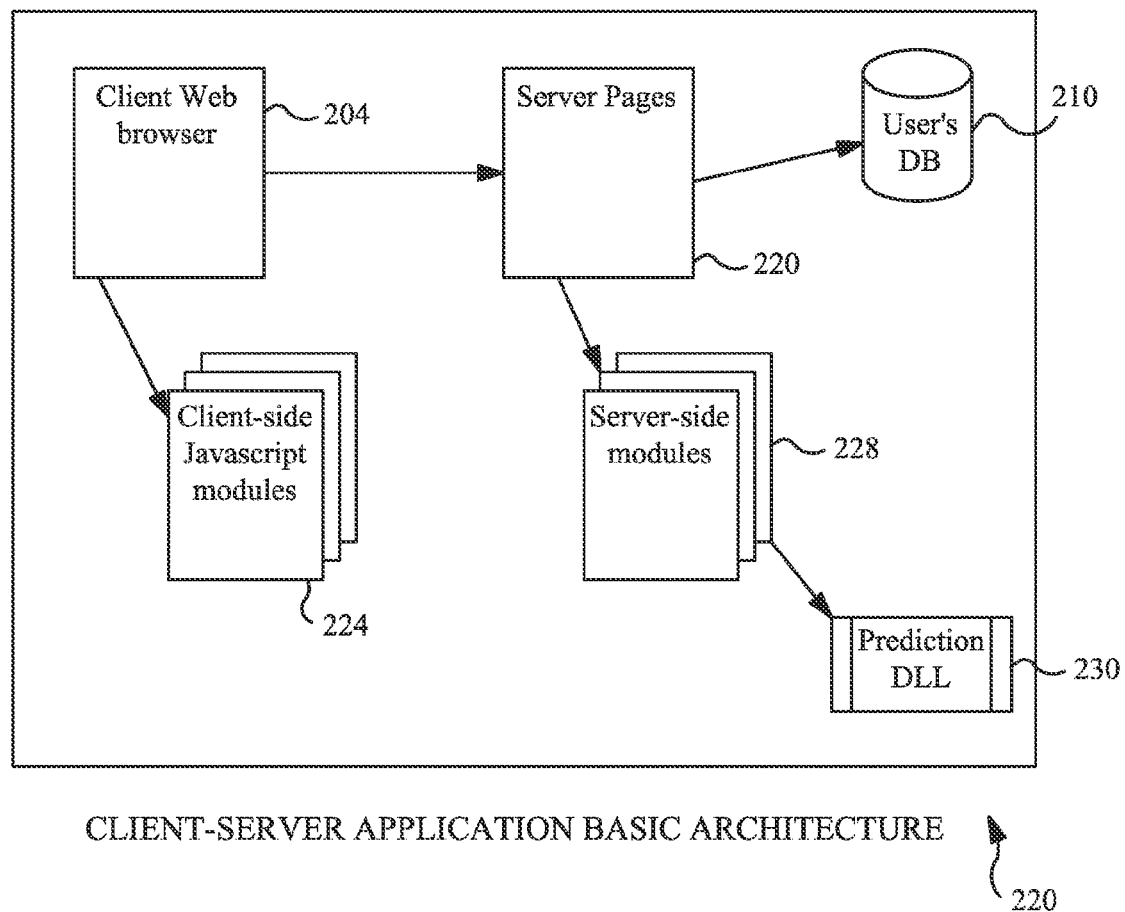
FIG. 2B is a block diagram illustrating a client-server software architecture for implementing a node placement process under one embodiment of the invention.

A software application or tool described in detail below provides a process for planning a three-dimensional multi-floor WLAN layout or infrastructure using multiple radio frequency technologies, such as 802.11a, 802.11b/g, Bluetooth, and so forth. A node layout and optimization process allows users to readily design and build a radio frequency (RF) coverage map based on user-defined network requirements. Referring to FIG. 2B, an example of a client-server model 220 for providing the process is shown. As noted above, the client Web browser 204 runs on a client computer and accesses one or more client-side executable files, such as JavaScript modules 224. These modules 224 can provide rendering and graphics functions, as described herein.

One or more server pages 226 are provided to the Web browser 204, including one or more pages (or pages populated with data) from the database 210. Server-side modules 228 are invoked to provide much of the functionality described below, including a prediction dynamic link library (DLL) 230.

C. USER INTERFACE AND LAYOUT INITIALIZATION

Referring to FIGS. 3 through 7, representative computer displays or Web pages will now be described with respect to creating and displaying an area for establishing a WLAN. The screens of FIGS. 3 through 7 may be implemented as Web pages under XML (Extensible Markup Language), XSLT ("Extensible Style Language Transformation"), HTML (HyperText Markup Language), or any other scripts or methods of creating displayable data, such as the Wireless Access Protocol ("WAP"). A backend may be created in .Net C#, client script implemented in javascript and svg script. The screens or Web pages provide facilities to receive input data, such as a form with fields to be filled in, pull-down menus, or entries allowing one or more of several options to be selected, buttons, sliders, hypertext links, or other known user interface tools for receiving user input. While certain ways of displaying information to users is shown and described with respect to certain Figures, those skilled in the relevant art will recognize that various other alternatives may be employed. The terms "screen," "Web page," and "page" are generally used interchangeably herein.

When implemented as Web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. (In particular, the page layout is stored in an svg file in a directory structure, while the database stores user information, assumptions, preferences, accounts, etc. as noted below.) In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

In general, for ease in describing features of the invention, the following Figures will at times be described in terms of a user interacting with a displayed page. As implemented, however, the user computer receives data input by the user and transmits such input data to the server computer via the Internet. The server computer then queries the database, retrieves the requested pages, and performs computations and/or provides output data back to the user computer, typically for visual display to the user. One skilled in the relevant art will appreciate that the concepts of the invention can be used in various environments other than the Internet. Various communication channels may be used, such as a LAN, a WAN, or a point-to-point dial-up connection.

Figure 3:
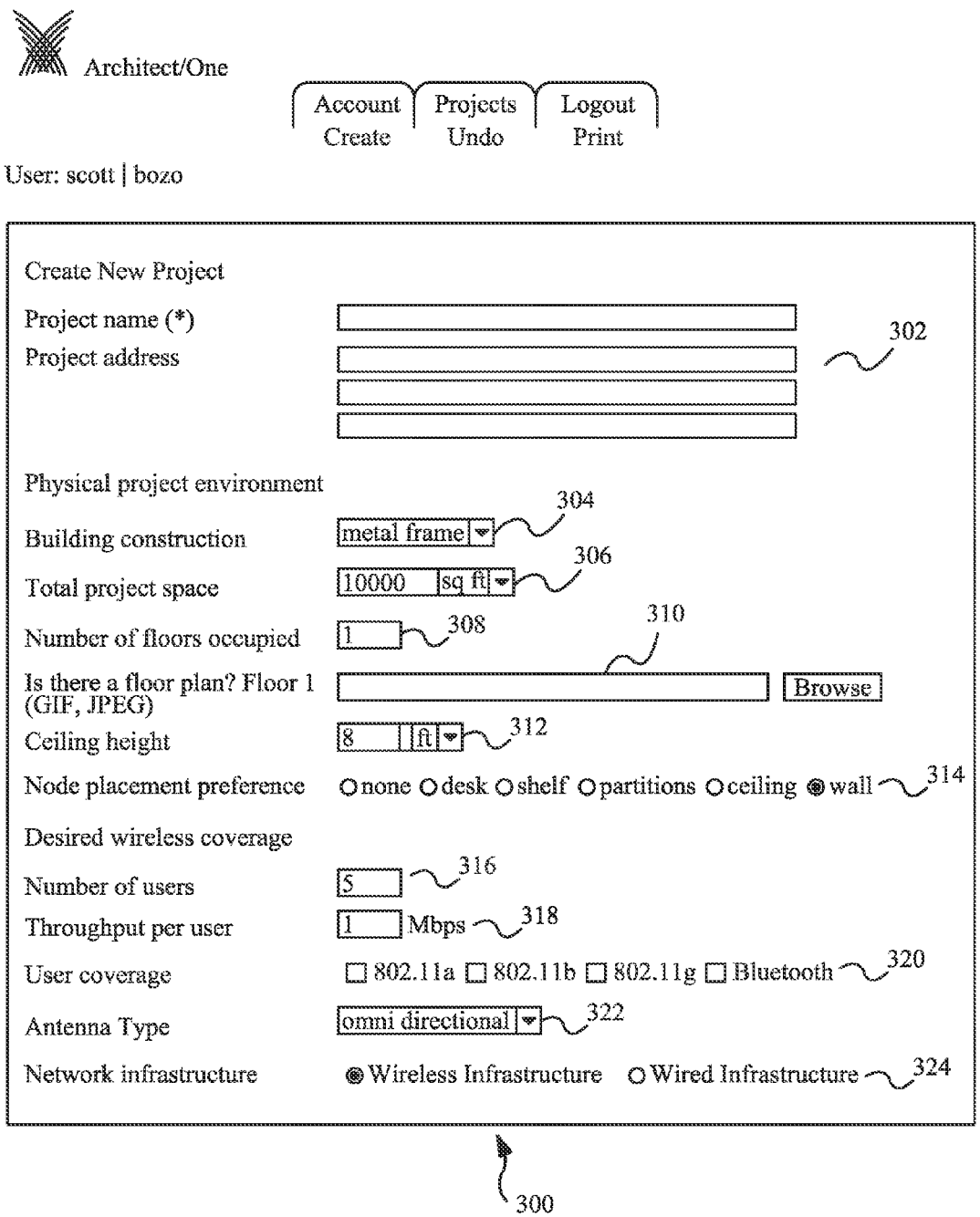
FIG. 3 is a computer screenshot of an initial screen for inputting information for a new node placement project.

Referring to FIG. 3, an example of a create new project screen 300 is shown. Such a page may be provided as one of the server pages 202 by the server 208 to the client or user computer 202 operating the browser 204 (FIGS. 2A and 2B). The user inputs information to the page 300 to help the optimization process predict site-specific coverage and capacity for a new wireless network. As shown, the user inputs a project name and address in an initial portion 302. Thereafter, the user inputs physical project environment criteria, including building construction (via a drop down menu) 304. As noted below, the dropdown menu 304 can include various construction types, including metal frame, brick, wood frame, and so forth. A total project space portion 306 allows the user to input a total project space and define either square feet or square meters, while a floors occupied field 308 indicates a number of floors to be occupied by the network.

The user may input a floor plan via field 310 under any of various file formats, such as JPEG, GIF, and so forth. The user can indicate ceiling height under field 312, and a node placement preference by selecting one of several radio buttons 314.

Thereafter, the user identifies desired wireless coverage, including a number of users in field 316, and a desired throughput per user in field 318. The user can select one or more types of wireless coverage in portion 320 of the page 300, and a type of antenna 322 (including omnidirectional or "don't know"). Finally, the user identifies a type of network infrastructure (connection to a wired network: wired, wireless, or "don't care") in a portion 324 The system allows the user to define many hotspots, each with different requirements.

The optimization process models propagation attenuation using one or more algorithms. One such algorithm is a modified COST231 Multi-Wall Model. Under this model, path loss is represented by free space loss added to losses induced by walls and floors penetrated by a direct path between a transmitter and receiver. Total floor loss is a nonlinear function based on the number of penetrated floors, and can be represented by the following equation.

$$L = L_{FS} + L_c + \sum_{i=1}^{I} k_{wi} L_{wi} + k_f^{\left[\frac{k_f+2}{k_f+1} - b\right]} L_f,$$

where $L_{FS}$=free space loss between transmitter and receiver,
$L_C$=constant loss,
$k_{wi}$=number of penetrated walls of type i,
$k_f$=number of penetrated floors,
$L_{wi}$=loss of wall type i,
$L_f$=loss between adjacent floors,
b=empirical parameter, and
I=number of wall types.

The constant loss value of $L_C$ results when wall losses are determined from measuring results by using multiple linear regression, but it is normally close to zero. The type of walls $L_{wi}$, represents, for example, a light wall that is non-load bearing (such as plaster board or particle board), while a heavy wall represents a load bearing wall made of concrete or brick. Other types include wood frame on metal frame walls.

Alternatively, a simple empirical one-slope model may be employed that assumes a linear dependence between path loss and logarithmic distance, and is represented by the following equation:

$$L = L_0 + 10n \cdot \log(d),$$

where $L_0$=the path loss at 1 meter distance,
n=power decay index, and
d=distance between transmitter and receiver meters.

Yet another simple model is a linear attenuation model, represented as follows:

$$L = L_{FS} + \alpha d$$

This model assumes that excess path loss (dB) is linearly dependent on a distance (m), and where α (dBm) is an attenuation co-efficient.

Yet another alternative, or additional, propagation model is a robust ray-based Motif Model described by M. Klepal et al., "Prediction of Wide-Band Parameters of Mobile Propagation Channel," URSI GA 2002, Maastricht.

Figure 4A:
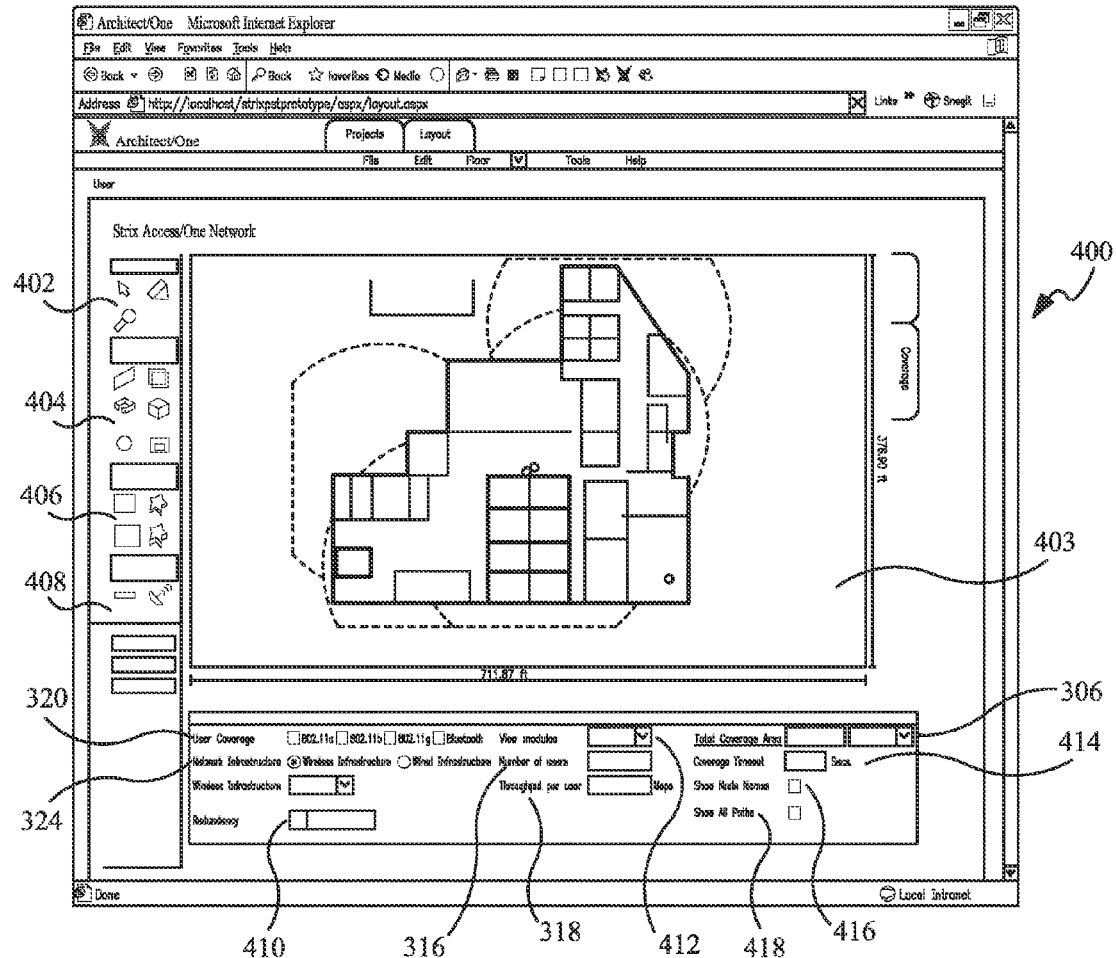
FIG. 4A is a computer screenshot of a user interface with tools and an example of a floor plan layout for a node placement project.

Referring to FIG. 4A, an example of a user interface for creating, depicting, and modifying a physical area in which to provide wireless coverage is shown as a layout screen 400. The user interface includes a tools portion 402 that allows the user to select items depicted in a primary or central portion 403, to set a scale, and to magnify images. A floor layout portion 404 allows a user to create walls, rooms, cubicles, radio obstruction objects, or other items within a floor layout. The floor layout portion 404 also allows users to identify locations of power outlets, Ethernet plug connection ports, or other existing infrastructure elements.

Figure 11:
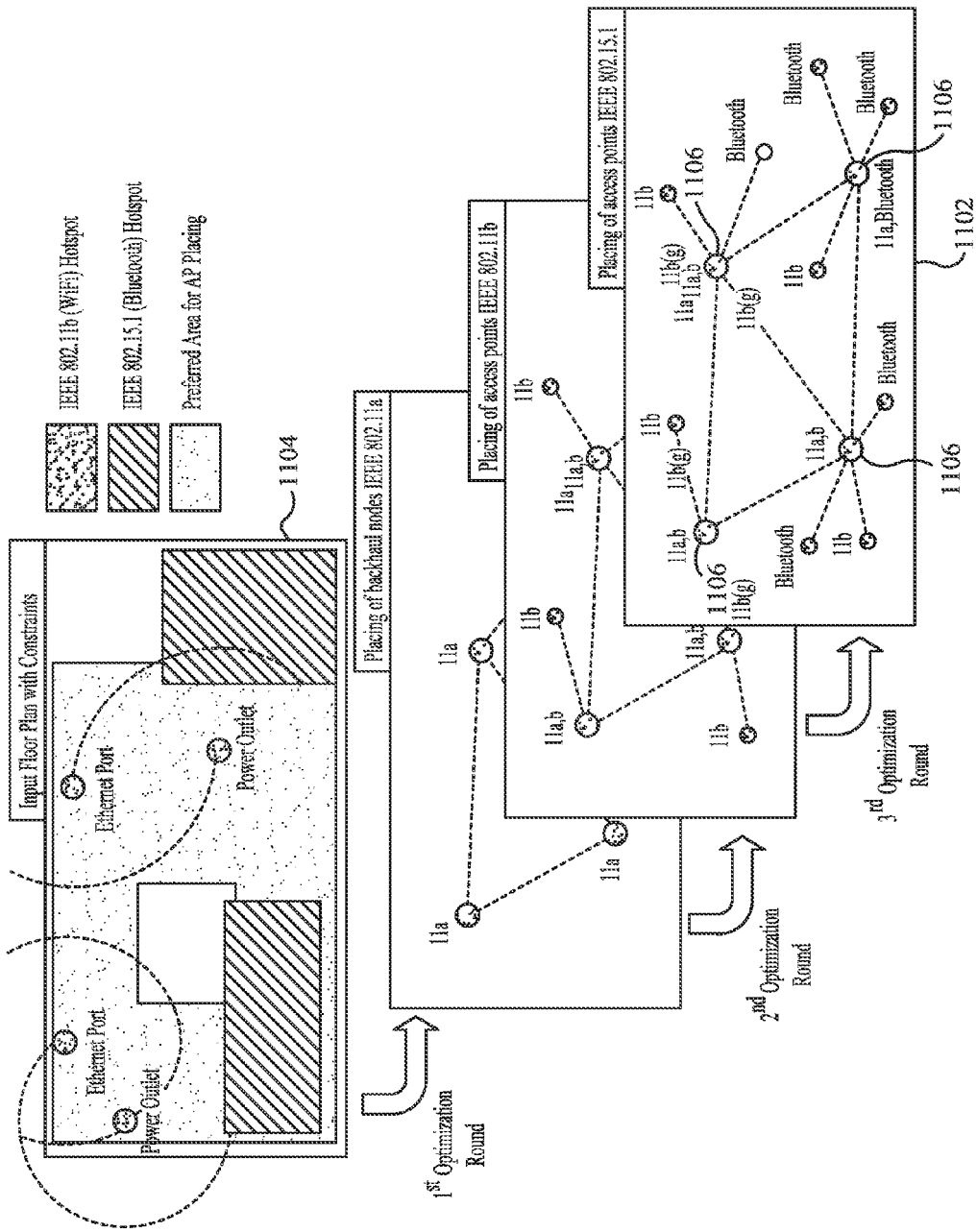
FIG. 11 is an example of node layout optimization performed by the optimization process of FIGS. 8A and 8B.

A coverage outline portion 406 allows a user to define rectangular or arbitrary-shaped areas of wireless access, or areas with no access. The coverage outline portion 406 allows the user to define, for example, desired Bluetooth coverage areas, desired 802.11b coverage areas, and so forth. (An example of such an initial layout with the desired coverage areas is shown in FIG. 11, and described below.) A custom gear portion 408 allows the user to define or place wireless nodes, antennas, or other objects.

In sum, an input floor plan would thus include not only the location of main obstacles and the layout of hot spots of various technologies, but it would also consider the position of Ethernet ports, power outlets, and the like to force AP placement into preferred areas that reduce additional wiring. Further, the user can specify certain coverage areas for particular technologies (e.g., Bluetooth, 802.11b, etc.), as well as other criteria to be considered by the optimization process in automatically defining a WLAN layout.

As shown, a lower portion of the layout screen 400 includes many of the options selected by the user under the new project page 300 (FIG. 3). It also includes a redundancy slider bar 410 that allows the user to select desired node or coverage redundancy from zero to 100%. Thus, the user can specify whether the WLAN is to provide overlapping coverage, and thus redundancy, in the event of node failure or other potential problems. A view modules drop down menu box 412 allows a user to show all modules, or only specific ones, such as 802.11b or Bluetooth modules. A coverage timeout field 414 allows the user to input a number of seconds a user is willing to wait for the optimization algorithm to converge to a solution. If the algorithm times out, a user has an option to simplify the environment or ease the restrictions set for the project. A show node names selection box 416 allows the user to depict in the central portion 403 the various node names, while a show all paths selection 418 causes the system to display paths that each node takes to get to the main wired network (a simple example of which is shown in FIG. 11).

Figure 4D:
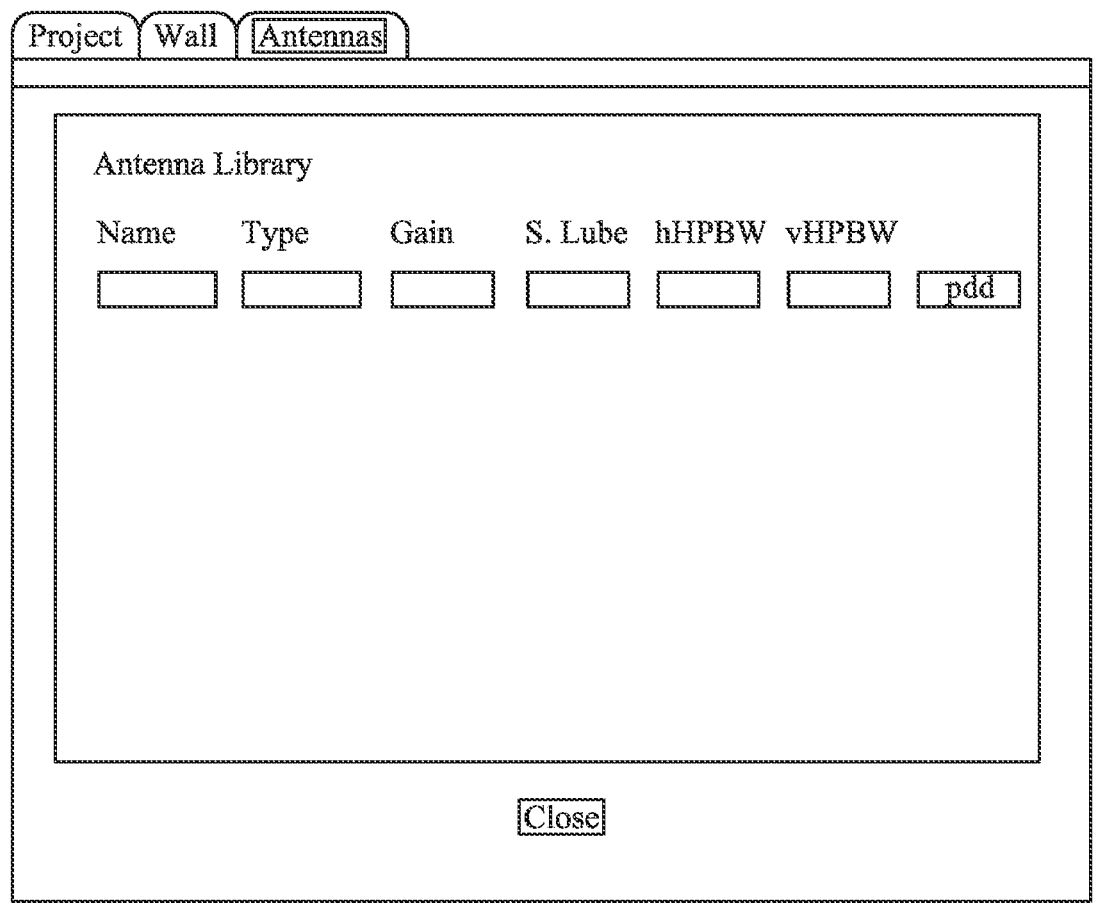
FIG. 4D is a computer screenshot showing user-configurable antenna library parameters.

Referring to FIGS. 4B through 4D, the user may obtain, through an appropriate menu or link (not shown), access to particular project, wall, or antenna assumptions or parameters to further refine or clarify portions of the project layout. As shown in FIG. 4B, the user can specify antenna types, Ethernet port constraints, power outlet constraints, nodes per server, minimum number of servers, wireless mode model (I slope, multi-wall, etc.), setting (office, commercial, corridor, and so forth), as well as transmit power, bit rate, and square coverage for various 802.11 or other wireless protocols.

As shown in FIG. 4C, the user can adjust various wall assumptions. The user can define a name of a particular type of wall, and then specify attenuation for the various types of wireless technologies, as well as floor propagation values. As shown in FIG. 4D, the user can likewise define antenna parameters, by giving each antenna a name, its type (beam, isotropic, hemispherical, etc.), and specify gain, side lobe, and directivity (horizontal and vertical half power beam width (hHPBW and vHPBW)).

Figure 5:
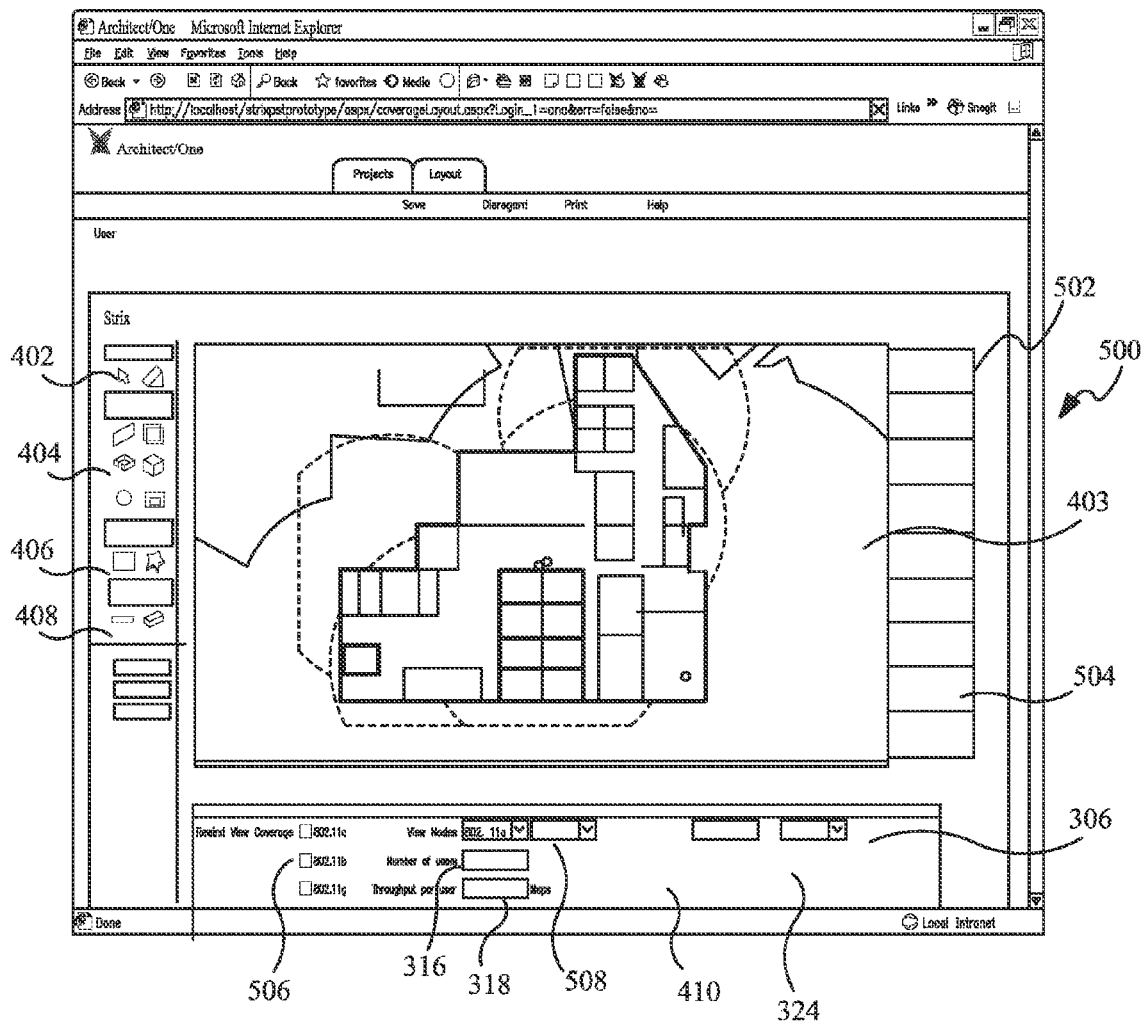
FIG. 5 is a computer screenshot of a node coverage layout for the floor plan layout of FIG. 4A.

Referring to FIG. 5, any example of a coverage layout page and user interface 500 is shown. The central portion 403 shows the floor layout with each node and its associated coverage. The coverage is shown with a color-coordinated key to visually depict changes in signal strength, ranging from green (54 Mbps at −68 dBm) to orange-red (6 Mbps at −87 dBm) (followed by deep red: no coverage at below −87 dBm).

A view nodes portion or option boxes 508 allow a user to change the color coded coverage depending on the type of wireless technology (e.g., 802.11b, Bluetooth). Each type of wireless technology has its own wireless coverage and the displays or views can be switched by selecting the appropriated technology in the option boxes 508. The user can also specify a desired user coverage by defining transmit and receive values (in dBm), and frequency at a specified Mhz. Further, when the user places the mouse pointer on any part of the displayed coverage layout in FIG. 5, an actual return signal strength indicator (RSSI) value for that particular point is shown next to the pointer. Then the user can save the proposed node placement, or disregard it and go back to the original view (e.g., FIG. 4A).

By selecting the drop down Tools menu from the layout page 400, the user can initiate the optimization process to get coverage based upon a provided layout, show the coverage (such as that shown in FIG. 5), and provide a detailed listing of equipment inventory. The "get coverage" option also leads to the display of FIG. 5, but a difference between the get and show coverage options is that the get coverage option places APs, while the show coverage option only gives the RSSI values (in a color coded manner) of the previously defined/placed APs.

FIG. 6 shows an example of inventory by node for the example layout shown in FIG. 5. Clicking on an Inventory by Module tab 602, a listing such as that shown in FIG. 7 is displayed to the user. The information provided in FIGS. 6 and 7 is generally self-explanatory. As shown, the display of FIG. 6 can facilitate system administrators in understanding the physical make up of the WLAN. The display of FIG. 7 can help the system administrator determine estimated costs in establishing the WLAN proposed by the system. For example, based on userInput parameters, such as a number of users and required bandwidth per user, the system can determine not only a minimum number of radios, but also a total number of required modules, associated costs, etc. Further, the user can then, e.g. reduce the required bandwidth per user, and see associated cost savings for such a change.

After defining or inputting a layout in which the user wishes to provide wireless network coverage, the process automatically predicts and places nodes for optimum layout and quantity to achieve the user's desired network parameters, as defined above. As noted above, the user simply defines hot spot areas for each type of technology (802.11b, Bluetooth, etc.) with the desired network requirements (e.g., wired network infrastructure backhaul). The optimization process determines the quantity and placement of APs within the specified layout under one of several techniques. The user also has the freedom to place his or her own nodes, move the calculated nodes, and show the coverage for any layout of nodes.

D. OPTIMIZATION PROCESS

Figure 8A:
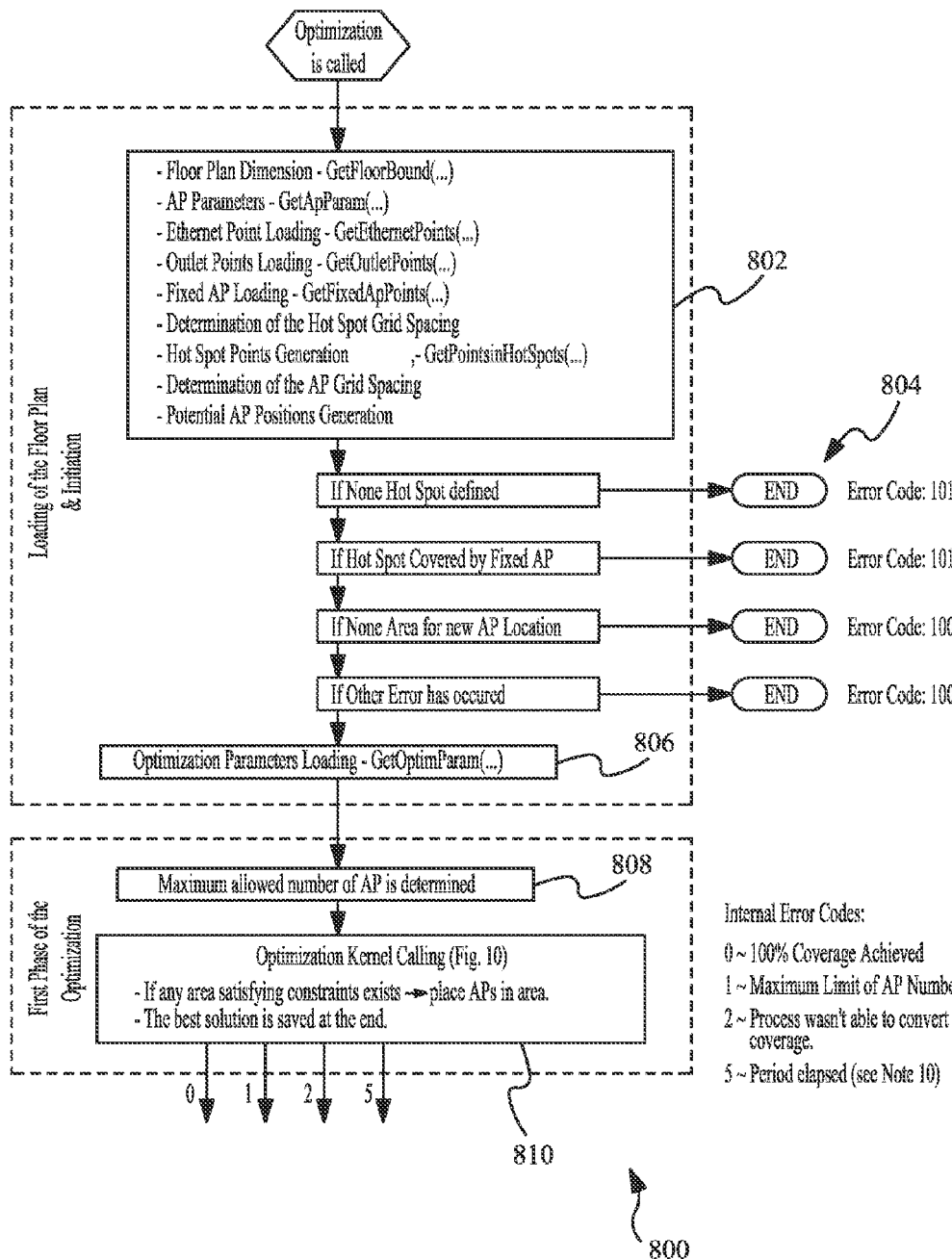
FIGS. 8A and 8B together form a flow diagram illustrating a node placement optimization process under one embodiment of the invention.
Figure 8B:
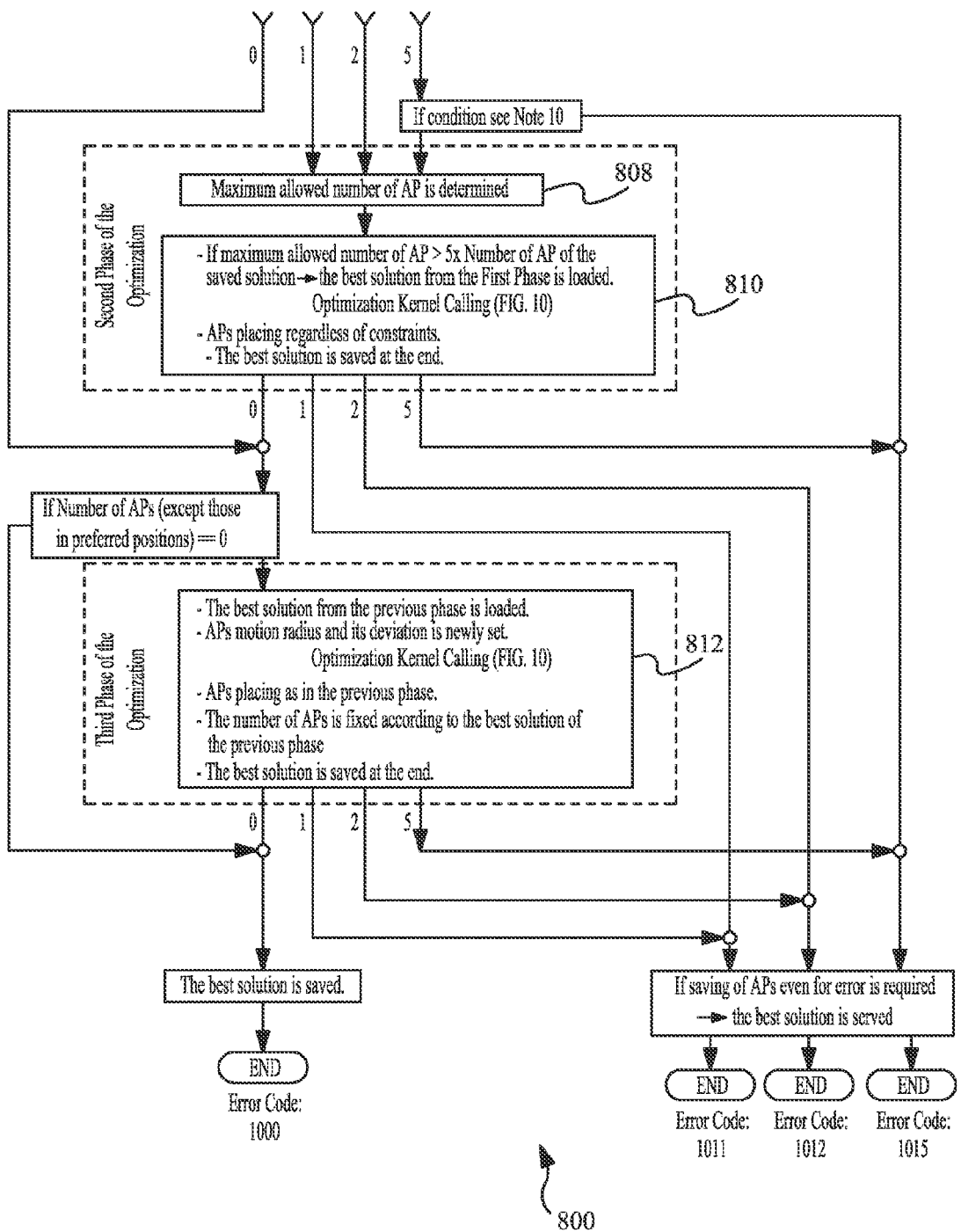
Figure 10:
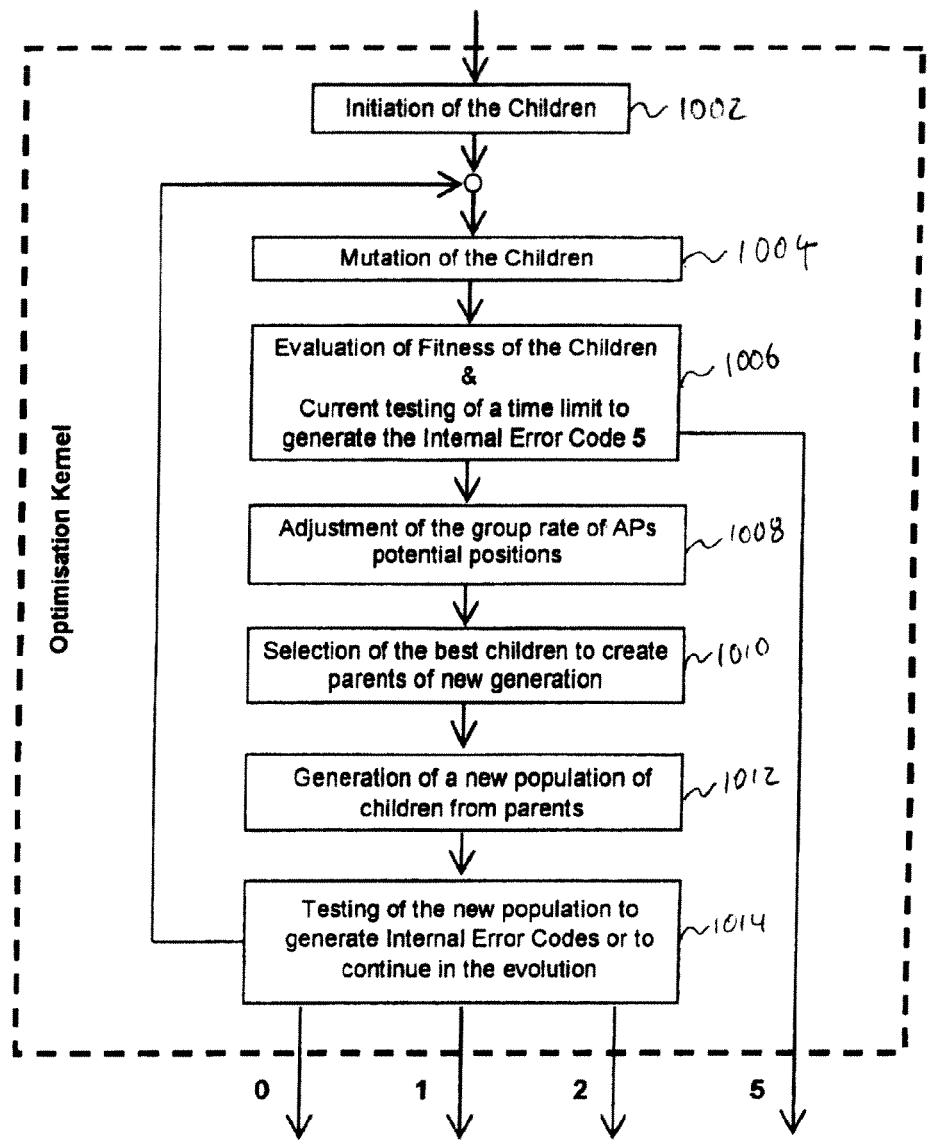
FIG. 10 is a flow diagram of an optimization kernel process for use by the optimization process of FIGS. 8A and 8B.

FIGS. 8A and 8B show an example of the optimization process, shown as a routine or process 800. FIGS. 8A, 8B and 10 are representative flow diagrams that depict processes used in some embodiments. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

Optimizing a heterogeneous WLAN is a complex process because the required hot spot areas for each technology generally spread through a building and overlap, and the optimization process 800 must consider various obstacles or attenuation. One embodiment of the optimization process 800 employs three phases or rounds preceded by an initiation or initialization. Under the initialization phase, the optimization process 800 Inputs the previously defined floor plan dimensions and AP parameters, as noted above (block 802). If the floor plan includes Ethernet or electrical outlet points, these may also be loaded and considered, as well as fixed access points required by the user. Further, the optimization process 800 determines hot spot grid spacing, generates hot spot points, determines AP grid spacing, and identifies potential AP positions.

To perform its calculations and optimizations, the optimization process 800 digitizes hot spot areas into a discrete series of two-dimensional grids. Thus, the optimization process 800 divides the floor plan layout into a grid with a constant grid cell size that is predetermined, but may be adjusted. Such a grid is determined by the size of the hot spot, and it is scaled appropriately based on the layout, type of technology employed, user-input parameters, and so forth. The optimization process 800 then only validates or uses grid points, rather than areas between such points, to help speed the process by forcing only a discrete set of available points. Thus, the process 800 identifies potential AP positions based on only x and y grid coordinates or intersection points.

The optimization process 800 then determines if one or more errors have occurred, such as if no hot spots were defined, if a hot spot is already covered by a fixed AP, if no areas are available for new AP locations, or for other errors (block 804 and described below). If any such errors have occurred, the optimization process 800 terminates. If no errors occur, however, then the optimization process 800 loads user-defined optimization parameters (block 806). These parameters include those noted above. Additionally, the optimization process 800 may load or employ one or more lookup tables that compare a given technology's bandwidth or bit rate with receive sensitivity. Examples of such table are shown in FIGS. 9A and 9B. For example, the process 800 determines an estimated square coverage area of each wireless technology based on a given coverage area based on a given bit rate (i.e., the "Correction" column). Then, the process 800 employs the table of FIG. 9B. As explained below, the process 800 can then determine a minimum number of radios and hot spot locations based on a number of users, required bandwidth per user and the tables of FIGS. 9A and 9B.

After receiving user-defined or user-input criteria or other initialization, the optimization process 800 begins one or more optimization algorithms or methods. The optimization process may employ a conventional Downhill Simplex method, or an Exact Conjugate Gradient method, as well as others. However, under an embodiment depicted as an optimization kernel 1000 in FIG. 10, evolutionary computation techniques are employed, such as Evolution Strategies or Genetic Algorithms. Such an evolution strategy algorithm employs primary operators called mutation, reproduction, and crossover, which refer to similar processes found in biology. Each cycle or phase is called a generation, where each generation produces children who are possible solutions to the optimization problem. These children are then mutated and those that deviate from the optimal goal are discarded to obtain a better solution. The process repeats with the remaining children until an optimal solution is found. Such algorithms are indeterministic and probabilistic, meaning that they may give different solutions each time they are run and sometimes may not converge into a solution. One embodiment of the invention employs an Evolution Strategy Algorithm having 5 parents with 500 children. It further includes a σ self-adaptation mechanism, with coordinate-dependent mutation strengths $\sigma_n$ and a learning parameter T equal to approximately 0.15. Employing N coordinate-dependent mutation strengths avoids a prematurity of convergence for parameters with a weak influence on a fitness function. (As used herein, the term "genetic algorithm" refers to both evolution strategies and genetic algorithms, and encompasses the routines and methods described under this section.)

As noted above, the optimization process employs three optimization phases. Under a first optimization phase, the optimization process 800 begins by building a backhaul wireless mesh (if specified by the user), such as by using IEEE 802.11a, to ensure sufficient network throughput and uplink connectability with sublayers to a fixed (wired) network. Under a second phase or round (described below), the process establishes a WiFi sublayer (e.g., IEEE 802.11a) to ensure sufficient throughput in a relevant hot spot area. Finally, in a third phase or round (described below) the optimization process 800 arranges a layout of, for example, 802.11g or Bluetooth access points (IEEE 802.15.1) to cover specified hot spots.

An example of the three optimization rounds is shown in FIG. 11. As shown, a first optimization round receives the input floor plan with user-defined constraints (including power outlets, Ethernet ports, and existing desired WiFi and Bluetooth hot spots, as well as a preferred area for AP placement). After a first round of optimization, the optimization process generates a series of 802.11a backhaul nodes. Thereafter, under a second optimization round, a series of 802.11b or g APs are established, each of which is connected to one of the 802.11a backhaul nodes. Finally, in a third optimization round, several Bluetooth APs are added. Comparing a final topology 1102 with an initial floor plan with constraints 1104, FIG. 11 shows how the optimization process 800 positioned backhaul nodes 1106 near power outlets and Ethernet ports (where possible) to provide ready access to power, Ethernet access, or both. 802.11b nodes (shown as "11b") and Bluetooth AP5 are positioned to conform to the user's desired or existing hot spot areas.

Referring back to the specifics of FIG. 8A, under the first optimization phase, the optimization process 800 in block 808 determines a maximum number of allowed APs. Under block 810, the optimization process 800 calls the optimization kernel 1000 (FIG. 10), and thereafter places APs in an area that satisfies the user's constraints. The optimization process 800 then saves the best solution.

Referring to FIG. 8B, the second optimization phase is performed, where the process determines a maximum number of allowed APs 808. The number of APs is determined by a required RSSI value in the hotspot, the dimensions of the hotspot, the wireless technology and the transmit power of APs within the wireless technology. If the maximum number of APs is greater than five times the number of APs under the previously saved solution, the best solution from the first phase is loaded under block 810. The optimization kernel 1000 (FIG. 10) is again called and APs placed regardless of constraints, with the best solution saved at the end. If the routine times out and produces an error (error "5"—routine fails to converge or achieve a result in sufficient time), then the routine provides an error message to the user who can simplify the environment or ease the timeout restrictions set for the project (box 414 above). Other errors or flags produced by the routine are shown by the arrows and at the bottom right of in FIG. 8A, namely: 0-100% coverage achieved (optimization finished successfully), 1—Maximum number of APs exceeded, 2—Routine was not able to provide 100% coverage.

The routine produces other errors or flags, as shown in FIGS. 8A and 8B. Examples of such errors are:

1001 Other Error (some error other than those noted here occurred)

1003 Nowhere to Place Access Points (nothing to optimize)

1010'No Hot Spot defined (nothing to optimize)

1011 Optimization Process Failed to Converge (e.g., desired coverage cannot be reached)

1012 Optimization Process was not able to converge 100%, but a best solution was saved anyway

1013 Complete coverage was reached with fixed APs only; no need for optimization

1015 Timeout-Optimization Aborted

Many other errors are possible, such as errors in reading certain parameters, such as floor number, floor thickness, wall, Ethernet port, outlet, etc. With each error, the routine may provide a dialog box or other data to the user, who can then work to correct the error.

Under the third optimization phase, the best solution from the previous phase is loaded in block 812. AP motion radius $R_m$ and its deviation is newly set. The motion radius represents a radius of an area where each AP is allowed to move under the routine. In other words, the routine only permits the optimization routine to adjust or move an AP within a predetermined radius (under block 1008, described below). The deviation represents an error, such as a standard deviation for AP movement with respect to the radius. The optimization kernel 1000 (FIG. 10) is then called. Thereafter, APs are placed as in the previous phase and the number of APs fixed according to the best solution of the previous phase, with the best solution saved at the end.

Referring to FIG. 10, the optimization kernel 1000 begins by initiating the children under block 1002. In other words, the kernel begins what it is called In genetic algorithms "population" by generating possible solutions called children. Each solution in this case is a positioning of a number of APs at points in the grid, and many solutions are initially created (e.g., 500). Under block 1004, the children are mutated according to the specifications and requirements of the project. Under block 1004, the kernel 1000 performs crossover operations, meaning that parents from previous generations are combined with the children to generate new, better children. The values mutated are the number of placed APs, the motion radius, the transmit power of APs, and the rate of revival (as explained below).

Under block 1006, the fitness of each child is evaluated, and a time limit is tested. The children are evaluated against a fitness function and the RSSI requirements, power requirements, and/or other user-specified parameters. Only those children (i.e., solutions or AP layouts) who are good enough will survive and pass to the next generation. This is known in genetic algorithms as "survival of the fittest." Error code 5 is the same code as in image 8a and 8b it's the timeout. Under block 1006, the optimization kernel 1000 checks whether a timeout timer is greater than the specified timeout, and if so, returns error code 5, noted above. Under block 1008, APs are adjusted to potential positions. In other words, the children are rearrange to other potential positions that would satisfy the user-specified parameters more efficiently.

Under block 1010, the best children are selected to become parents for a new generation. Under block 1012, children are created based on the new parents. In other words, the fittest children according to conditions under 1006 and 008 get selected in block 1010, and pass to the next generation as parents under block 1012. In block 1014, the new population of children is tested to determine whether any errors exist (i.e., the errors noted above). Thereafter, the optimization kernel 1000 loops back to again perform blocks 1004 through 1014.

The evolution strategy algorithm employed by the optimization kernel 1000 requires a chromosome structure of variable length, which depends on an actual number of APs in the solution represented by the chromosome. An example of a chromosome structure is shown in FIG. 12. There can be two types of APs in the solution, namely, APs placed in preferred positions $N_p$, and APs freely placed anywhere N, to meet predefined requirements. The preferred positions are specified by the user, or are given by positions of nodes in an upper network layer. For example, the preferred position for WiFi APs in the second optimization round would be the positions of backhaul nodes from the prior optimization round.

The chromosome structure can be divided into three parts. The first, fixed part, shown in FIG. 12, comprises three variables driving mainly the number of APs in the solution. The second and third parts have variable length and consist of both kinds of APs, such as 802.11b and Bluetooth. The only parameter optimized for an AP in a preferred position is its radiation power $P_N$ (e.g. RSSI), in contrast to freely placed APs, whose position is also optimized in addition to its power.

The chromosome structure may again be analogized with biology. In life a chromosome is a set of DNA molecules arranged in a certain fashion which stores genetic information of a live cell. In genetic algorithms a chromosome has a similar meaning. The so-called "chromosome" structure is an abstract data type to model the solution of the problem (which in this case is optimum AP layout). As with other abstract data types, it consists of a mathematical model that could be a data structure and a set of operations on this structure. In the illustrated system, the basic object or data type consists of a header, a collection of fixed APs (or APs with preferred placements), and a collection of freely placed APs. The header contains a current length of the collections and a rate of revival value $r_N$ that helps in the mutation process. The preferred APs collection has those APs fixed by the user, while the freely spaced collection contains APs placed by the algorithm. These components effectively represent the DNA molecules that form a biological chromosome. When the chromosome data structure is mutating, the number of freely placed APs, the rate of revival, the power of each AP and the motion radius are transformed to obtain better solutions according to the input information, the same way as nature over the years transforms DNA to generate better qualified more specific cells.

A problem of AP location optimization is due to difficulties in defining a fitness (cost) function. Such a fitness function should incorporate many suitably weighted factors, such as user coverage, number and position of APs, AP interference, and so forth, so it produces a multi-dimensional fitness landscape that encourages an optimization process convergence.

Figure 13:
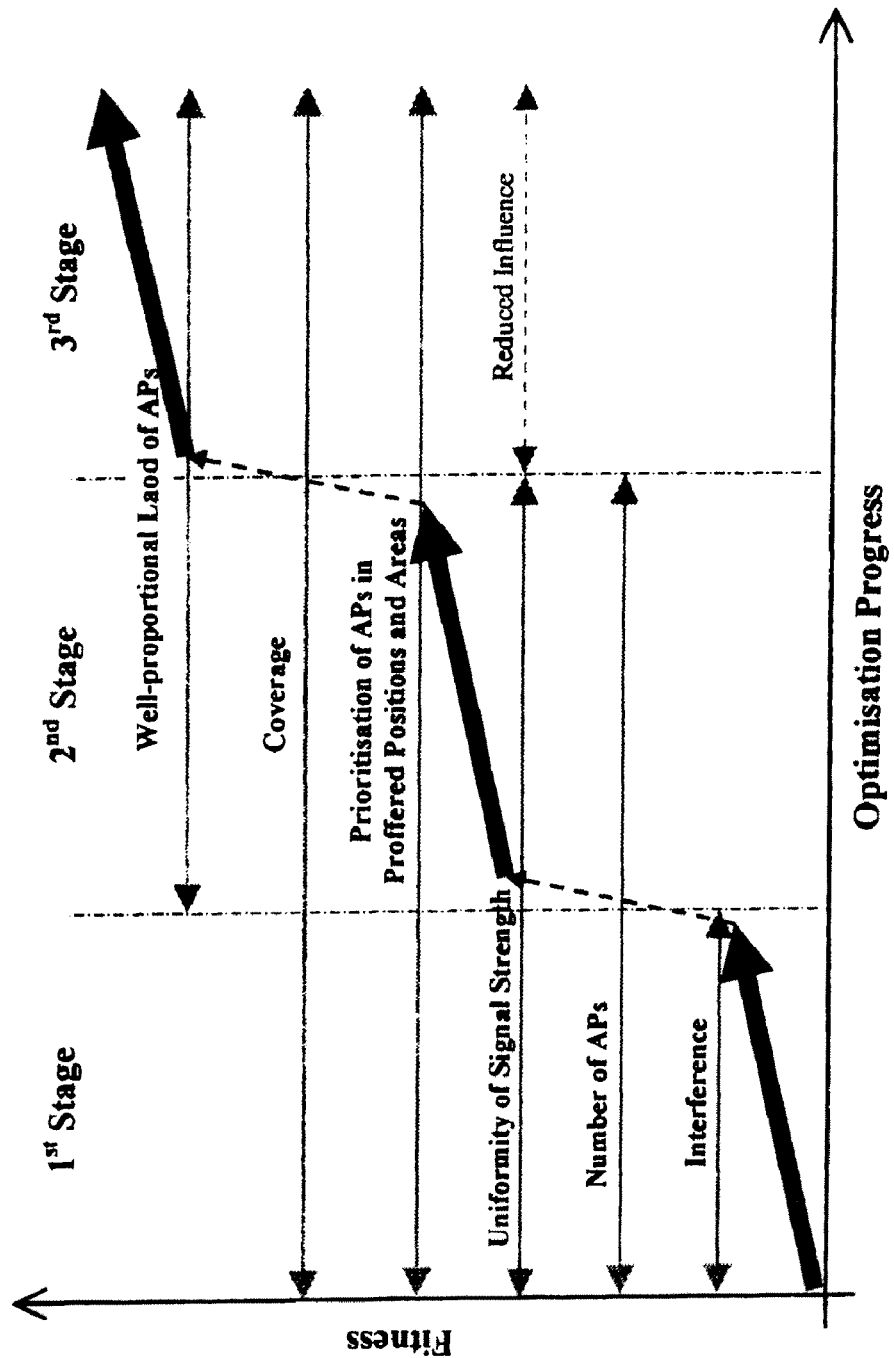
FIG. 13 is a graph depicting three stages of optimization under the optimization process.

To enhance optimization process convergence, the different factors can change their weights during the rounds or phases of the optimization process, or even be ignored during a given phase (given a multiplicative weight of zero). Emphasizing or de-emphasizing certain variables (by weighting them) during different phases or stages of the optimization process encourages convergence. An example of this is shown in FIG. 13. Throughout the entire optimization process, each optimization phase ensures adequate user coverage and prioritization of APs in certain areas. A function of the first phase is to achieve required user coverage and network throughput by a minimum number of APs and uniformity of signal strength, and such requirements are further achieved during the second round, but interference considerations are only considered during the first round. During the third round, the optimization process works to ensure a well-proportioned load of all APs.

Overall, a duration of the complete optimization process 800 depends naturally on the scale of the building and a number of various technologies dictating the number of optimization rounds. The optimization process enables automated design of heterogeneous WLAN layouts with minimum input requirements and computation time.

E. CONCLUSION

Aspects of the invention are particularly useful in providing communications with mobile wireless units or devices within a picocellular system. A picocellular system typically refers to a wireless system having wireless base stations with extremely low power designed to cover an extremely small area, such as one floor of an office building. Indeed, short range wireless communication as described herein generally refers to an effective range of 500 meters or less (and with Bluetooth, often less than 100 meters), although some systems may reach up to 1 kilometer depending upon the wireless transmission protocol and power level. Access points, nodes or base station units described herein are generally fixed relative to a given location. The location may be any stationary building or geographic space (such as a parking lot or park). Alternatively, the node may be fixed relative to a movable object such as a vehicle (e.g., train, ship or plane).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number respectively.

The teachings of the invention provided herein can be applied to other systems, not necessarily the system described herein. For example, while much of the above Detailed Description discusses the IEEE 802.11 and Bluetooth standards, aspects of the invention may be implemented using other wireless standards, protocols or frequencies, such as CDMA, GSM, and IEEE 802.1 and 802.20. The elements and acts of the various embodiments described above can be combined to provide further embodiments.

All of the above patents and applications and other references, including any that may be listed in accompanying filing papers, as well as patent application Ser. No. 10/549, 342 filed Mar. 24, 2004, entitled "Self-Configuring, Self-Optimizing Wireless Local Area Network System"; U.S. patent application Ser. No. 10/139,609, filed May 2, 2002, entitled "Wireless Base Station To Base Station Synchronization In A Communication System, Such As A System Employing a Short-range Frequency Hopping Or Time Division Duplex Scheme"; and Application No. PCT/US03/28840, filed Sep. 12, 2003, entitled "Network Access Points Using Multiple Devices", all commonly assigned, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the node placement routine may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method, comprising:
    receiving a layout of a space and user-specified parameters of a wireless local area network, said user-specified parameters comprising a requirement to employ one or more wireless network protocols;
    performing a first phase of an algorithm by automatically providing a first solution for an optimized layout of wireless access points within said space using at least in part said user-specified parameters, wherein said first phase comprises identifying a location of backhaul nodes for connecting said wireless local area network to an external wired network using at least one of said one or more wireless network protocols to ensure connectivity of said wireless local area network with a wired network;
    performing a second phase of said algorithm by further automatically adjusting said first solution and providing a second solution for said optimized layout of the wireless access points within said space, wherein the second phase comprises identifying locations of the wireless access points using one or more of said one or more wireless network protocols to ensure sufficient throughput in said wireless access points, and
    performing a third phase of said algorithm by further automatically adjusting said second solution and providing a third solution for said optimized layout of the wireless access points within said space, wherein the third phase comprises identifying locations of the wireless access points using at least two or more of said one or more wireless network protocols to ensure sufficient throughput in said wireless access points in corresponding hot spot areas of said space comprised in said user-specified parameters.

2. The method of claim 1, wherein said optimized layout of the wireless access points provided in said third phase have a different number of said wireless access points than provided in said optimized layout of the first and second phases but at least partially overlap with said wireless access points provided in said first and second phases.

3. The method of claim 1, wherein said algorithm is a genetic algorithm, and said first, second and third phases of said genetic algorithm are performed using converging multiple solutions for said wireless access points.

4. The method of claim 1, wherein one of said one or more wireless network protocols used in the third phase is a BLUETOOTH protocol.

5. The method of claim 1, wherein said optimized layouts of the wireless access points provided in said first and second phases have a different number of said wireless access points but partially overlap.

6. The method of claim 1, wherein the second phase comprises identifying locations of said wireless access points using at least two of said one or more wireless network protocols to ensure sufficient throughput in said wireless access points in corresponding hot spot areas of said space comprised in said user-specified parameters.

7. The method of claim 1, wherein said one or more wireless network protocols are one or more of wireless local area network protocols: IEEE 802.11a, IEEE 802.11b, IEEE 802.11g, and BLUETOOTH.

8. The method of claim 1, wherein at least one of the user-specified parameters has different weights during the first and second phases.

9. The method of claim 1, further comprising:
    displaying said optimized layout of the wireless access points within said space using color-coding for identifying different wireless network protocols of said one or more wireless network protocols.

10. The method of claim 1, wherein said space comprises a number of floors, a ceiling height, and wall dimensions, and wherein said user-specified parameters comprise one or more of: antenna specifications, a wall type attenuation, a bit rate or a transmit power for said one or more wireless network protocols, locations of power outlets in said space, locations of Ethernet connections in said space, whether the wireless local area network is to be connected via wires or wirelessly to an external wired network, at least one user-specified location of a fixed or preferred wireless local area access point, a number of users, a required bandwidth, and an error rate.

11. A computer software product, comprising a computer-usable medium having computer readable instructions stored thereon for execution by a processor to perform a method comprising:
    receiving a layout of a space and user-specified parameters of a wireless local area network, said user-specified parameters comprising a requirement to employ one or more wireless network protocols;
    performing a first phase of an algorithm by automatically providing a first solution for an optimized layout of wireless access points within said space using at least in part said user-specified parameters, wherein said first phase comprises identifying a location of backhaul nodes for connecting said wireless local area network to an external wired network using at least one of said one or more wireless network protocols to ensure connectivity of said wireless local area network with a wired network; and performing a second phase of said algorithm by further automatically adjusting said first solution and providing a second solution for said optimized layout of the wireless access points within said space, wherein the second phase comprises identifying locations of the wireless access points using one or more of said one or more wireless network protocols to ensure sufficient throughput in said wireless access points, and performing a third phase of said algorithm by further automatically adjusting said second solution and providing a third solution for said optimized layout of the wireless access points within said space, wherein the third phase comprises identifying locations of the wireless access points using at least two or more of said one or more wireless network protocols to ensure sufficient throughput in said wireless access points in corresponding hot spot areas of said space comprised in said user-specified parameters.

12. An apparatus, comprising:

a processor, configured to receive a layout of a space and user-specified parameters of a wireless local area network, said user-specified parameters comprising a requirement to employ one or more wireless network protocols, configured to perform a first phase of an algorithm by automatically providing a first solution for an optimized layout of wireless access points within said space using at least in part said user-specified parameters, wherein said first phase comprises identifying a location of backhaul nodes for connecting said wireless local area network to an external wired network using at least one of said one or more wireless network protocols to ensure connectivity of said wireless local area network with a wired network, and configured to perform a second phase of said algorithm by further automatically adjusting said first solution and providing a second solution for said optimized layout of the wireless access points within said space, wherein the second phase comprises identifying locations of the wireless access points using one or more of said one or more wireless network protocols to ensure sufficient throughput in said wireless access points, and configured to perform a third phase of said algorithm by further automatically adjusting said second solution and providing a third solution for said optimized layout of the wireless access points within said space, wherein the third phase comprises identifying locations of the wireless access points using at least two or more of said one or more wireless network protocols to ensure sufficient throughput in said wireless access points in corresponding hot spot areas of said space comprised in said user-specified parameters.

13. The apparatus of claim 12, wherein said algorithm is a genetic algorithm, and said first, second and third phases of said genetic algorithm are performed using converging multiple solutions for said wireless access points.

14. The apparatus of claim 12, wherein one of said one or more wireless network protocols used in the third phase is a BLUETOOTH protocol.

15. The apparatus of claim 12, further comprising:

a display, configured to display said optimized layout of the wireless access points within said space, further configured to provide a user interface for entering said layout of the space and said user-specified parameters.

16. The apparatus of claim 12, wherein the second phase comprises identifying locations of said wireless access points using at least two of said one or more wireless network protocols to ensure sufficient throughput in said wireless access points in corresponding hot spot areas of said space comprised in said user-specified parameters.

17. The apparatus of claim 12, wherein said one or more wireless network protocols are one or more of wireless local area network protocols: IEEE 802.11a, IEEE 802.11b, IEEE 802.11g, and BLUETOOTH.

\* \* \* \* \*